No. 771,826. PATENTED OCT. 11, 1904.
J. W. MEAD & H. A. MACKIE.
STEREOPTICON.
APPLICATION FILED DEC. 19, 1903.
NO MODEL. 3 SHEETS—SHEET 2.
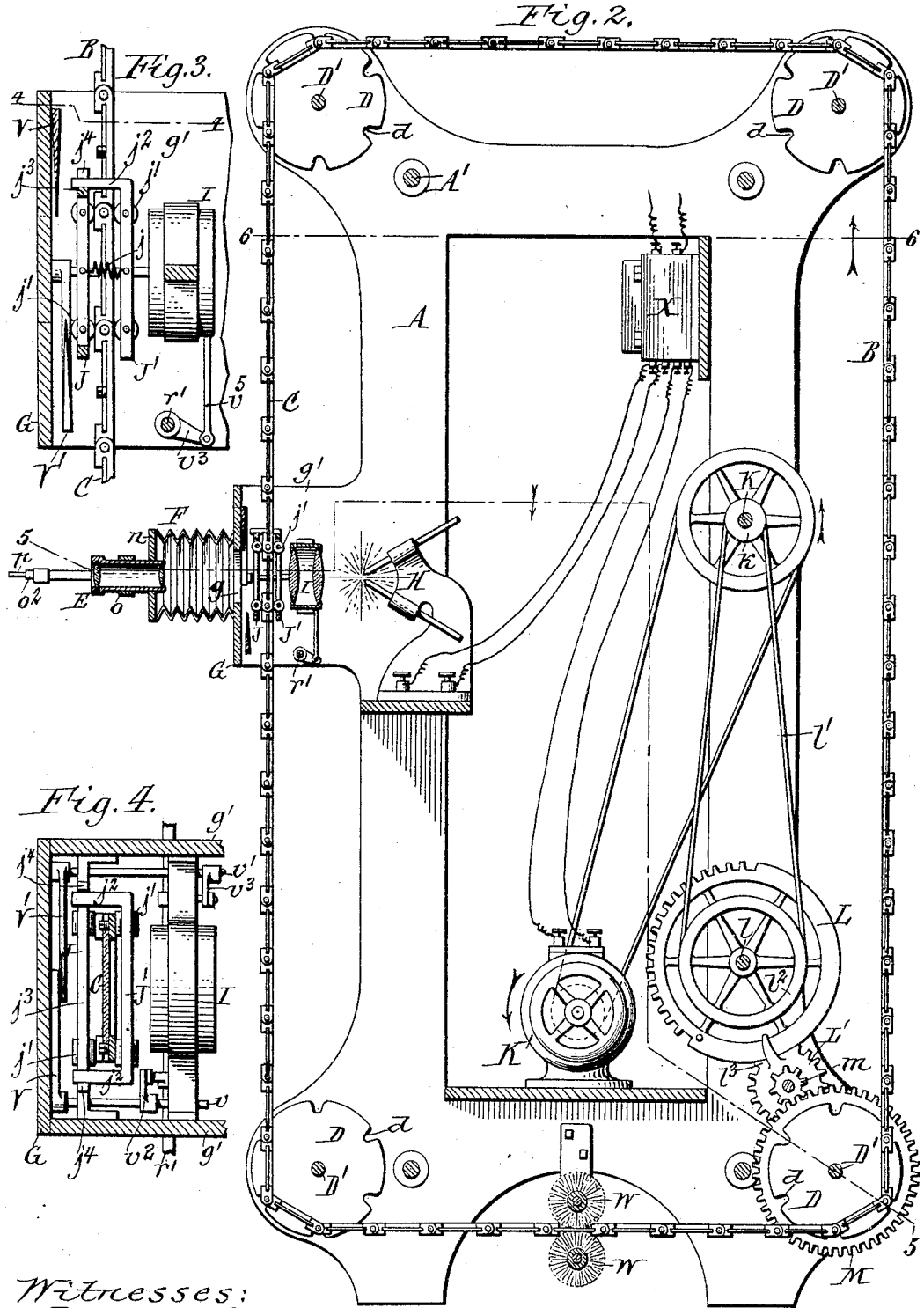
Witnesses:
Louis W. Gratz
Robert Weitknecht
John W. Mead,
Harry A. Mackie,
Inventors.
By Geyer & Popp
Attorneys.

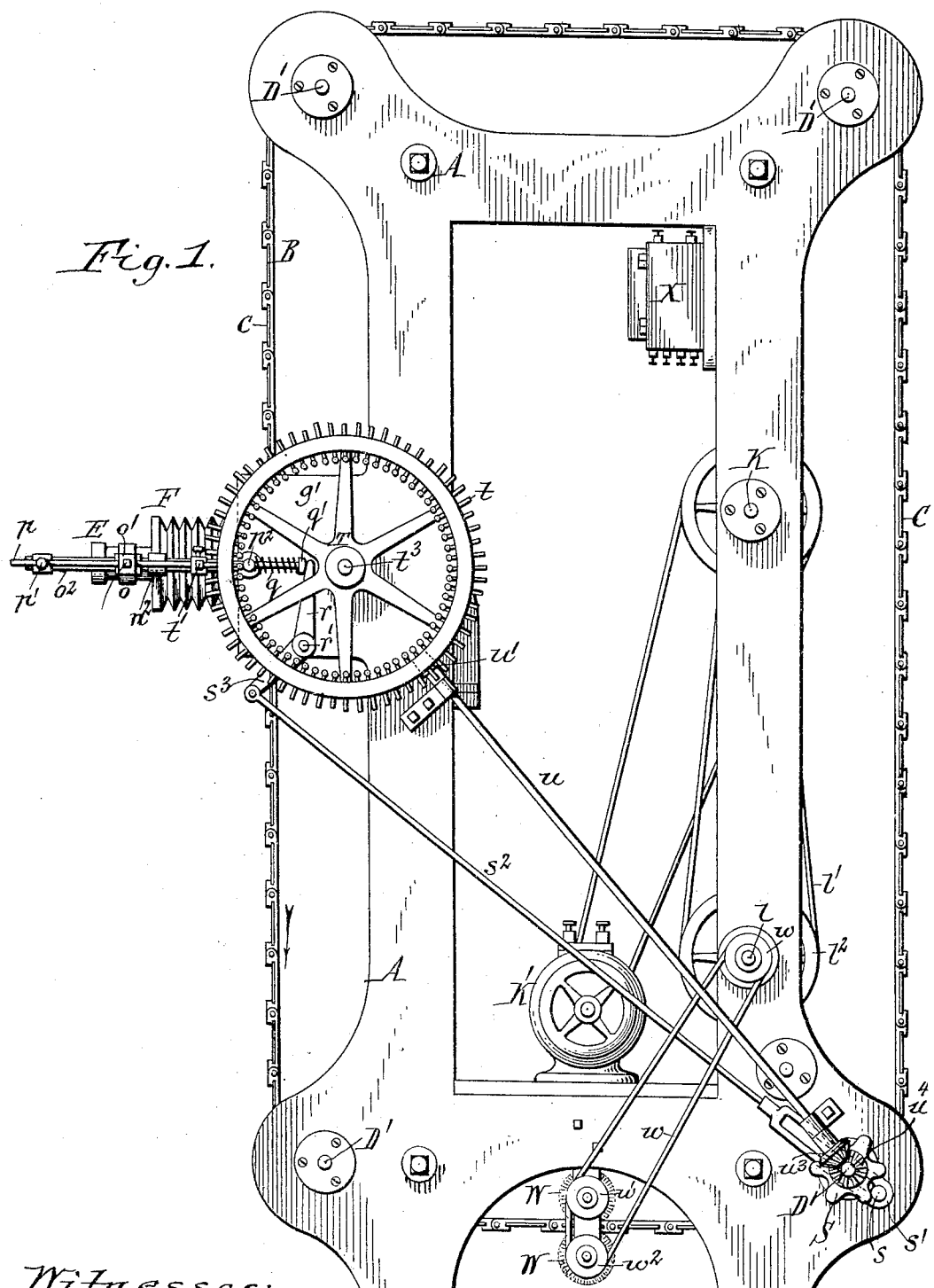

No. 771,828. PATENTED OCT. 11, 1904.
J. W. MEAD & H. A. MACKIE.
STEREOPTICON.
APPLICATION FILED DEC. 19, 1903.
NO MODEL. 3 SHEETS—SHEET 3.
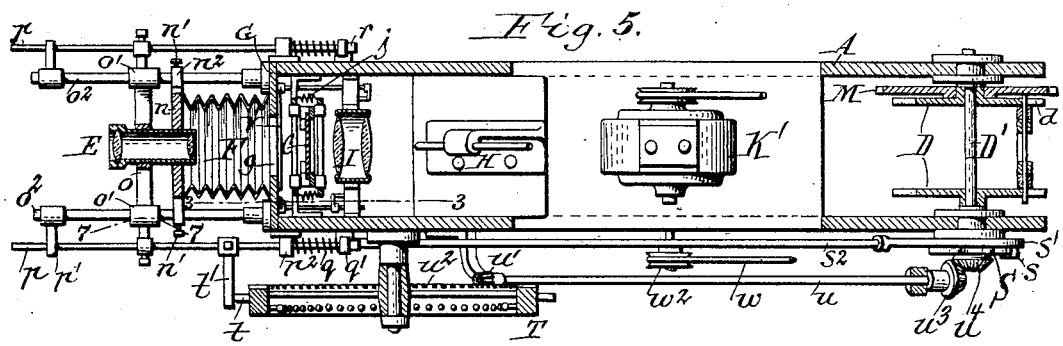
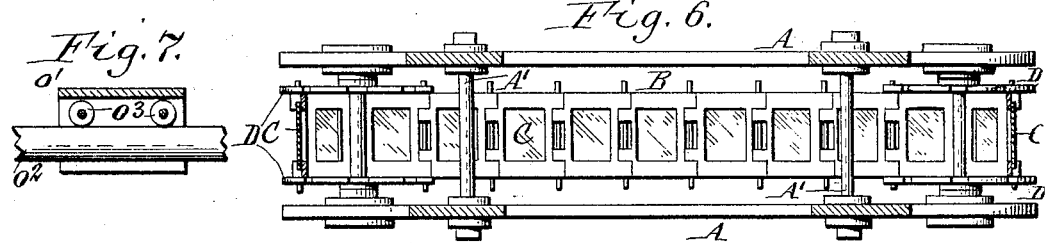
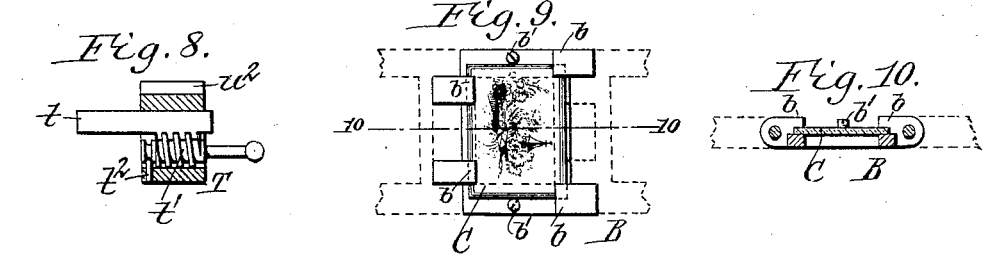
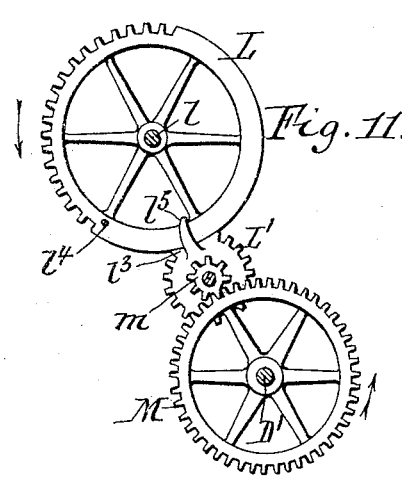
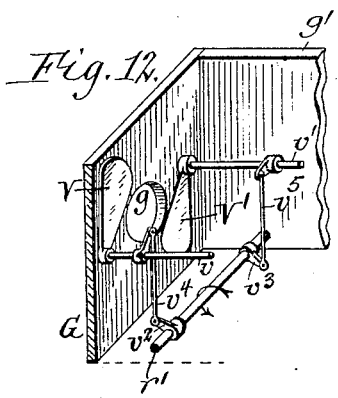
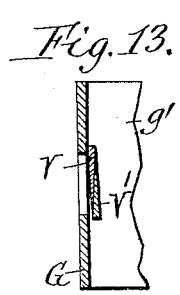
Witnesses:
Louis W. Gratz.
Robert Weitknecht.
John W. Mead,
Harry A. Mackie, Inventors.
By Geyer & Popp
Attorneys.

No. 771,828. Patented October 11, 1904.

UNITED STATES PATENT OFFICE.

JOHN W. MEAD AND HARRY A. MACKIE, OF AMSTERDAM, NEW YORK, ASSIGNORS, BY DIRECT AND MESNE ASSIGNMENTS, TO JOHN J. TURNER, GEORGE S. McFARLAN, AND HERBERT O. ROCKWELL, OF AMSTERDAM, NEW YORK.

STEREOPTICON.

SPECIFICATION forming part of Letters Patent No. 771,828, dated October 11, 1904.

Application filed December 19, 1903. Serial No. 185,779. (No model.)

*To all whom it may concern:*

Be it known that we, JOHN W. MEAD and HARRY A. MACKIE, citizens of the United States, residing at Amsterdam, in the county of Montgomery and State of New York, have invented new and useful Improvements in Stereopticons, of which the following is a specification.

This invention relates more particularly to the class of stereopticons in which a series of slides are mounted on a carrier which is intermittently actuated by automatic means for successively presenting the slides to the objective.

Different slides require different adjustments of the objective, and in order to obtain sharp and clear images from all of the slides on the carrier it is necessary to properly focus the apparatus for each individual slide.

The principal object of our invention is to provide the apparatus with means for automatically focusing the same for each slide as it is brought opposite the objective.

A further object of the invention is to provide the apparatus with an improved shutter and to improve its construction in other respects.

In the accompanying drawings, consisting of three sheets, Figure 1 is a side elevation of a stereopticon embodying our invention. Fig. 2 is a sectional elevation thereof. Fig. 3 is a fragmentary vertical longitudinal section in line 3 3, Fig. 5, on an enlarged scale. Fig. 4 is a horizontal section in line 4 4, Fig. 3. Fig. 5 is a similar section in line 5 5, Fig. 2. Fig. 6 is a horizontal section in line 6 6, Fig. 2, looking upward. Fig. 7 is an enlarged longitudinal section of the objective-carriage in line 7 7, Fig. 5. Fig. 8 is an enlarged transverse section of the focusing or stop wheel, showing the means for adjusting its pins. Fig. 9 is a fragmentary face view of the endless slide-carrier. Fig. 10 is a longitudinal section in line 10 10, Fig. 9. Fig. 11 is a detached sectional elevation of the intermittent driving mechanism of the slide-carrier. Fig. 12 is a sectional perspective view of the shutters and their operating devices. Fig. 13 is a vertical section of the shutters, showing the same fully closed.

Similar letters of reference indicate corresponding parts throughout the several views.

The stationary main frame of the machine consists of upright side frames A and transverse tie-rods A', connecting the same.

B is an endless chain belt or slide-carrier upon which the various slides C are mounted and which runs around four pairs of guide-wheels D, arranged at the corners of the frame. These guide-wheels are secured to horizontal shafts D', journaled in the side frames A. In the construction shown in the drawings the pintles of the belt-links are extended beyond the sides of the belt and adapted to engage in peripheral notches $d$, formed in the guide-wheels D, these notches being properly spaced to receive said pintles. Each belt-link carries one of the slides C, which latter are removably secured to the links by any suitable means. In the construction shown each link is provided on its face with undercut guide-lugs $b$, which receive opposite edges of the slide, and the latter is held in place by stop-screws $b'$. Upon removing one of these screws the slide can be withdrawn from the guide-lugs and another substituted for it.

E indicates the objective arranged opposite the vertical front portion of the slide-carrier B, and F is the usual expansible hood or bellows joining the objective at its front end. The rear end of the hood is secured to an upright plate G, arranged on the front side of the slide-carrier and having an aperture $g$ in line with the objective. The plate G is sustained by arms or brackets $g'$, projecting from the side frames A.

H indicates an electric-arc light or other source of light arranged on the rear side of the slide-carrier opposite the aperture $g$, and I is a condenser for concentrating the light upon the slides as they are successively moved opposite the objective.

In order to hold the slides firmly in position when presented to the objective, a suitable guide is arranged between the apertured plate G and the condenser I, through which guide the slide-carrier passes. As shown in Figs. 2, 3, 4, and 5, this guide preferably consists of a stationary upright frame or member J and an opposing yielding frame or member J', connected with the stationary member by springs $j$, which tend constantly to draw the movable member toward the stationary member, so as to clamp the carrier between the same. These members are provided with antifriction-rollers $j''$, which bear against the links of the slide-carrier. The yielding member J' is provided at its upper end with horizontal guide-arms $j^2$, which slide upon the upper cross-bar $j^3$ of the stationary member J and are confined against lateral displacement by lugs $j^4$, projecting upwardly from said cross-bars on the outer sides of said guide-arms.

An intermittent movement is imparted to the endless slide-carrier by any suitable means. The preferred mechanism shown in the drawings for this purpose is constructed as follows: K is the main driving-shaft of the apparatus, which may be driven by an electric or other suitable motor K'. L is a gear-wheel mounted on a horizontal shaft $l$ and driven continuously from a pulley $k$ on the main shaft K by a belt $l'$ and pulley $l^2$. A portion of the periphery of this gear-wheel—say about one-half—is smooth or toothless. L' is an intermittently-rotating pinion meshing with the gear-wheel L and having in addition to its usual narrow teeth a wide tooth $l^3$, provided with a concave outer edge adapted to bear against the edge of the smooth segment of said wheel, so that the pinion is stopped so long as its wide tooth is in engagement with said gear-wheel, as shown in Figs. 2 and 11. Motion is transmitted from the pinion L' to a gear-wheel M on one of the carrier-shafts D' by an intermediate pinion $m$. The gear-wheel L is provided with a pin $l^4$, arranged to strike an arm $l^5$ on the large pinion L' for turning the latter and moving its ordinary teeth into mesh with the teeth of the gear-wheel L. The latter has a sufficient number of teeth to effect one complete turn of the pinion L', this pinion being arrested during the remainder of the rotation of the large gear-wheel L. The transmitting-pinion $m$ is comparatively small, while the large pinion L' and the gear-wheel M on the carrier-shaft are so proportioned that for every complete turn of the pinion L' the wheel M is turned the proper distance to move the slide-carrier a single step—that is, the distance from one slide to the next—so as to successively bring the slides in line with the objective and allow the same to remain at rest for a short period, the duration of which is governed by the speed and diameter of the large gear-wheel L. As represented in the drawings, each of the notched or sprocket-wheels D has six notches, and to obtain the above-mentioned result the gear-wheel M on the carrier-shaft must therefore be six times as large in diameter as the pinion $m$.

For the purpose of automatically changing the distance between the slide-carrier and the objective to properly focus the apparatus for each individual slide one of these members is made adjustable with reference to the other and controlled by automatic means operating to move the same the necessary variable distances for producing the desired effect. We prefer to make the objective movable relatively to the opposing side of the slide-carrier, as illustrated in the drawings. As there shown, the objective-tube passes loosely through a central opening in the head $n$ of the bellows F and is mounted on a carriage $o$, to which it is fixed. This carriage has slides $o'$, which embrace horizontal guide-rods $o^2$, extending forwardly from the plates G on opposite sides of the bellows F, as best shown in Fig. 5, these slides being preferably provided with antifriction-rollers $o^3$, Fig. 7, which run upon the guide-rods. The bellows-head $n$ is adjustably secured to the guide-rods $o^2$ by set-screws $n'$, arranged in collars $n^2$, which project laterally from said head and embrace the guide-rods. The carriage $o$ is secured at its ends to a pair of horizontal shifting rods $p$, arranged on the outer sides of the guide-rods $o^2$ and parallel therewith and guided in lugs or bearings $p'$ $p^2$, projecting from said guide-rods and the side frames A, respectively. These shifting rods are constantly urged rearwardly by springs $q$, applied to the same between the rear sides of the lugs $p^2$ and collars $q'$, secured to the rear ends of the rods. The shifting rods are moved forwardly by arms $r$, bearing against their rear ends, and secured to a horizontal rock-shaft $r'$, journaled in the brackets $q'$. The shaft $r'$ is rocked by a rotary cam S, which acts upon a pin or roller $s$, carried by a yoke $s'$, the latter being connected by a rod $s^2$ with an actuating-arm $s^3$ on said rock-shaft. The cam is mounted on the adjacent shaft D', and the yoke $s'$ embraces this shaft, so as to be guided thereon. This cam has as many operating faces or teeth as there are notches in each of the guide-wheels D, there being six in the construction illustrated in the drawings, so that the carriage $o$ and the objective carried by it are moved forwardly every time the slide-carrier is advanced a step.

T is a focusing or controlling device which determines the extent of movement of the objective for the respective slides. This device preferably consists of a stop-wheel provided at its periphery with adjustable radial pins $t$, one for each slide or link of the endless carrier, which pins are adapted to move successively into the path of an arm $t'$, secured to one of the shifting rods $p$, so as to limit the rearward stroke of the carriage $o$ and arrest the same at the proper points to obtain sharp and clear images from the various slides. It will be understood that by adjusting the stop-pins $t$ toward or from the axis of the wheel T the objective on its return stroke will be stopped at a greater or less distance from the slide which for the time being registers therewith, each pin being previously adjusted to properly focus the apparatus for the corresponding slide. In the construction shown in the drawings the stop-pins are guided in radial openings formed in the rim of the wheel, and each pin is adjusted by means of a worm $t'$, which meshes with teeth on the pin, as shown in Fig. 8. The worm is held from longitudinal movement by a pin $t^2$, secured to the wheel and extending into an annular groove of the worm. The stop-wheel T is mounted on an arbor $t^3$, projecting from the frame of the machine. This wheel is intermittently rotated synchronically with the movements of the slide-carrier by any suitable means, the operating mechanism shown in the drawings consisting of an oblique shaft $u$, provided at its upper end with a bevel-pinion $u'$, which meshes with a gear-rim $u^2$ on the stop-wheel T, and at its lower end with a bevel-pinion $u^3$, which meshes with a similar pinion $u^4$, arranged on the shaft D', carrying the cam S.

V V' indicate a pair of shutters of semi-transparent material, such as frosted celluloid, which are arranged on the inner side of the plate G on opposite sides of the aperture $g$ and adapted to close the latter while the slide-carrier is being shifted. The shutters are preferably secured to independent horizontal rock-shafts $v$ $v'$, suitably supported on the plate G and actuated from the transverse rock-shaft $r'$ by arms $v^2$ $v^3$ and rods $v^4$ $v^5$, as best shown in Fig. 12. The actuating-arms of one of the shutter-shafts $v$ $v'$ are arranged oppositely to those of the other shaft to cause the shutters to approach and recede in covering and uncovering the aperture $g$. When the objective is advanced by the action of the rotary cam S, the shaft $r'$ is rocked in the proper direction to close the shutters, while when the objective is returned by the reaction of the springs $q$ said shaft is rocked in the opposite direction and caused to open the shutters. The latter overlap or pass each other more and more as they swing from their open to their closed position, and in order to dissolve the views during the movement of the slide-carrier the shutters are tapered or thinned toward their leading edges, so that as they approach their closed position they produce the effect of a single shutter, which gradually increases in thickness and decreases in transparency. The shutters are so graduated in thickness that during the first portion of their closing movement they produce a dissolving effect, but wholly prevent the passage of light by the time they are fully closed.

W W indicate a pair of cleaners, preferably rotary brushes, which serve to keep the slides free from dust and other deposits. These brushes run in contact with opposite sides of the slide-carrier B and may be driven from the motor K' by a belt $w$, running around pulleys $w'$ $w^2$ $w^3$, secured to the brush-shafts and the shaft of the gear-wheel L, respectively, as shown in Fig. 1.

A suitable time-switch X is preferably employed for automatically starting and stopping the apparatus at the desired times.

The operation of the apparatus is as follows: The slides being secured to the endless carrier B and power transmitted to the machine, a step-by-step movement is imparted to the carrier by the mechanism hereinbefore described, causing the slides to successively enter the guide J J' and come to a standstill opposite the objective and throwing the images on the screen. During the first portion of each advancing movement of the slide-carrier the objective-carriage $o$ is advanced to the extremity of its forward stroke by the action of the cam S and the rock-arms $r$, thereby compressing the return-springs $q$ and at the same time causing the stop-arm $t'$ of the carriage to recede from the stop-wheel T for clearing its pins $t$ and permitting the wheel to turn without restraint. As soon as a tooth of the cam clears the roller $s$ the springs $q$ move the carriage backward until it is arrested by its arm $t'$ encountering that pin $t$ of the stop-wheel which corresponds to the slide in register with the ojective and which has in the meantime been brought into the path of said arm by the partial rotation of said wheel. The objective is thus automatically adjusted to focus the apparatus for the particular slide which for the time being is in register with the objective, and this automatic adjustment of the objective in like manner takes place in connection with each of the remaining slides. Simultaneously with the initial movement of each step of the slide-carrier the shutters V V' are gradually closed, thus dissolving the views while one slide moves out of register and the next moves into register with the objective, the shutters being again fully opened by the time the new slide arrives directly opposite the objective.

We claim as our invention—

1. The combination of a slide-carrier and an objective, one of said members being movable toward and from the other, automatic means for adjusting said movable member, and means for actuating the slide-carrier, substantially as set forth.

2. The combination of a slide-carrier and an objective, one of said members being adjustable toward and from the other, an automatic focusing device controlling the adjustment of said movable member, and means for actuating the slide-carrier, substantially as set forth.

3. The combination of a slide-carrier and an objective, one of said members being adjustable toward and from the other, an automatic focusing device controlling the adjustment of said movable member, and mechanism for actuating the slide-carrier and said focusing device synchronously, substantially as set forth.

4. The combination of a slide-carrier, an objective movable toward and from the same, an automatic focusing device controlling the adjustment of the objective, and mechanism for actuating said slide-carrier and said focusing device intermittently and synchronously, substantially as set forth.

5. The combination of a slide-carrier, an objective movable relatively thereto, means for automatically adjusting the objective for each slide, and means for actuating the slide-carrier, substantially as set forth.

6. The combination of a slide-carrier, an objective, a carriage for the objective movable relatively to the slide-carrier, and a focusing-wheel having a series of controlling-surfaces arranged at different distances from its axis and operating on the objective-carriage, substantially as set forth.

7. The combination of a slide-carrier, an objective, a carriage for the objective movable relatively to the slide-carrier, a focusing-wheel carrying a series of stops located at different distances from its axis and arranged to limit the movement of said carriage in one direction, and means for moving the carriage toward said focusing-wheel, substantially as set forth.

8. The combination of a slide-carrier, an objective, a carriage for the objective movable relatively to the slide-carrier, a focusing-wheel carrying a series of stop-pins located at different distances from its axis and arranged to limit the movement of said carriage in one direction, a spring for moving the carriage toward said wheel, and means for moving the carriage in the opposite direction, substantially as set forth.

9. The combination of a slide-carrier, an objective, a carriage for the objective movable relatively to the slide-carrier, a focusing-wheel provided with a series of stop-pins which are adjustable toward and from its axis and adapted to engage said carriage, and means for operating the focusing-wheel, substantially as set forth.

10. The combination of a slide-carrier, an objective, a carriage for the objective movable relatively to the slide-carrier, a focusing-wheel provided with a series of radially-movable stop-pins adapted to engage said carriage, a rotary adjusting-worm for each of said pins held against endwise movement in the focusing-wheel, and means for operating said wheel, substantially as set forth.

11. The combination of a slide-carrier, an objective-carriage movable toward and from the same, a shifting rod connected with said carriage, a spring for retracting said rod, a rock-shaft having an arm which moves said rod forwardly, and a stop device constructed to arrest said carriage at different points in its rearward movement, substantially as set forth.

12. The combination of a slide-carrier, carriage-guides arranged at an angle to said carrier, an objective-carriage mounted on said guides, shifting rods for the carriage arranged on opposite sides of its guides and parallel therewith, retracting-springs applied to said rods, a rock-shaft having arms arranged to move said shifting rods forwardly, and a stop device constructed to arrest said carriage at different points in its rearward movement, substantially as set forth.

13. The combination with an objective and a slide-carrier, of a rotary cleaning-brush running in contact with said carrier, and means for operating said brush, substantially as set forth.

14. The combination with an objective and a slide-carrier, of a pair of rotary cleaning-brushes running in contact with opposite sides of said carrier, and means for operating the brushes, substantially as set forth.

Witness our hands this 16th day of December, 1903.

JOHN W. MEAD.
HARRY A. MACKIE.

Witnesses:
E. H. PARKIS,
FLORENCE E. PEARSON.